United States Patent
Peltonen et al.

(10) Patent No.: US 7,264,666 B2
(45) Date of Patent: Sep. 4, 2007

(54) STARCH-BASED ADHESIVES

(75) Inventors: Soili Peltonen, Rajamäki (FI); Hannu Mikkonen, Rajamäki (FI)

(73) Assignee: Valtion teknillinen tutkimuskeskus, Espoo (FI)

( * ) Notice: Subject to any disclaimer, the term of this patent is extended or adjusted under 35 U.S.C. 154(b) by 0 days.

(21) Appl. No.: 10/504,298

(22) PCT Filed: Feb. 17, 2003

(86) PCT No.: PCT/FI03/00118

§ 371 (c)(1),
(2), (4) Date: Aug. 12, 2004

(87) PCT Pub. No.: WO03/068884

PCT Pub. Date: Aug. 21, 2003

(65) Prior Publication Data

US 2005/0087103 A1    Apr. 28, 2005

(30) Foreign Application Priority Data

Feb. 15, 2002    (FI) ................................. 20020317

(51) Int. Cl.
*C09J 103/06*    (2006.01)

(52) U.S. Cl. ................. 106/207.1; 106/145.1; 106/162.81; 106/162.9; 106/207.4; 106/207.5; 156/336

(58) Field of Classification Search ............. 106/145.1, 106/162.81, 162.9, 207.1, 207.4, 207.5; 156/336
See application file for complete search history.

(56) References Cited

U.S. PATENT DOCUMENTS

| | | | | | |
|---|---|---|---|---|---|
| 2,422,328 | A | * | 6/1947 | Young | ............... 106/146.1 |
| 3,346,558 | A | * | 10/1967 | Roth | ..................... 536/18.6 |
| 4,223,129 | A | * | 9/1980 | Roth et al. | ............ 536/18.6 |
| 5,688,845 | A | | 11/1997 | Eden et al. | |
| 6,369,215 | B1 | * | 4/2002 | Peltonen et al. | ........... 536/108 |

FOREIGN PATENT DOCUMENTS

| WO | WO-92/22606 A1 | 12/1992 |
|---|---|---|
| WO | WO-99/64466 A1 | 12/1999 |
| WO | WO-03/068823 A1 | 8/2003 |

* cited by examiner

*Primary Examiner*—David M. Brunsman
(74) *Attorney, Agent, or Firm*—Birch, Stewart, Kolasch & Birch, LLP

(57) ABSTRACT

The invention relates to an adhesive formulation that comprises a starch-based adhesive dissolved in water. According to the invention the adhesive is made up of a native starch transglycosylation product and the solids content of the adhesive formulation is at least 45% by weight. The invention also relates to a method for preparing such adhesive formulations and to the use of the adhesives.

14 Claims, No Drawings

STARCH-BASED ADHESIVES

The present invention relates to starch-based adhesives and their preparation. The present invention in particular relates to adhesive formulations which contain a starch-based adhesive dissolved in water, characterized in that the adhesive is made up of a transglycosylation product of native starch.

The invention further relates to a method for the preparation of aqueous adhesive formulations, according to which method a starch-based polymer is dissolved in water, and to a method for increasing the solids content of starch-based adhesive formulations.

The invention also relates to the use as an adhesive of a native starch transglycosylation product.

Starch-based adhesives are used for gluing paper and board products. Aqueous adhesive formulations of starch soluble in dextrin or cold water represent the adhesives used. Starch-based adhesives, in particular those based on native starch, are preferable, since, being natural products, they are fully recyclable.

Aqueous adhesive formulations have the disadvantage that the water present in them has to be vaporized/evaporated after the application of the adhesive. The evaporation of the water is expensive and requires external energy, since the heat present in the web does not suffice for it.

For this reason efforts have been made to increase the solids content of aqueous adhesive formulations. In this case the increase in the viscosity of the formulations becomes a problem; it has not been possible to increase the solids content without rendering the mixture so viscous that it cannot be applied by conventional methods to the surface or web to be glued.

The object of the present invention is to eliminate the disadvantages associated with the state of the art and to provide a completely novel adhesive formulation that contains a starch-based adhesive which has a high solids content but is at the same time applicable by conventional methods.

The invention is based on the idea that the adhesive formulation contains, in addition to any other starch components, a transglycosylated starch. Starch transglycosylation products are previously known. Transglycosylation products have been prepared from native starch by reacting the starch with various alcohols, such as methanol, butanol, ethylene glycol, propylene glycol, butane diol or glycerol, in acid conditions, whereby there form alkyl glucoside compounds, which are in this context also called "transglycosylation" products. In these, an alkyl or hydroxyalkyl group is linked through an ether bond to C-1 of the anhydroglucose unit. Corresponding products have also been prepared from the monomer of starch, i.e. glucose.

In known technology, transglycosylation products have been prepared from native starch, in which case the reaction has been carried out in conditions that cause the degradation of the starch chains to glucose monomers or glucose oligomers that contain a few anhydroglucose units. Compounds of this type have been usable as surfactants, since it has been possible to link a hydrophobic alkyl chain to the anhydroglucose group. The use of monomeric methyl glycoside as a hot melt adhesive is previously known, but no other adhesive applications have been suggested.

In the invention it has been observed, surprisingly, that transglycosylation products of native starch can be used as such or together with conventional starch adhesives for preparing aqueous formulations having a high solids content (45% by weight or higher) but at the same time a low or moderately low viscosity. An especially interesting embodiment is represented by the option wherein the present transglycosylation products are used for increasing the solids content of conventional adhesive compositions.

The products according to the invention can be prepared simply by forming a mixture of a starch and an etherifying alcohol, which is mixed and heated until a clear melt is obtained. To catalyze the reaction, a catalytic amount of an acid substance, such as sulphuric acid or p-toluene sulfonic acid, is added to the alcohol. In cases in which the transglycosylation product is poorly soluble or insoluble in water the reaction product can be separated from the reaction mixture simply by precipitating it in water. It is also possible to carry out the preparation process in one step, in which case the alcohol is removed by evaporation.

The adhesive is prepared by dissolving the native starch transglycosylation product in water, possibly together with another starch-based adhesive, in order to produce an aqueous solution having a solids content of at least 45%.

More specifically, the products according to the invention are mainly characterized in that the adhesive is made up of a transglycosylation product of native starch.

The method according to the invention for the preparation of an adhesive formulation is, for its part, characterized in that the starch-based polymer used is a native starch transglycosylation product, which is mixed with and dissolved in water, optionally together with another starch-based adhesive, in order to produce an aqueous solution having a solids content of at least 45%. The method according to the invention for increasing the solids content of aqueous solutions is characterized in that to a mixture or solution containing a starch-based adhesive there is added a starch transglycosylation product so that its concentration will be 0.1-75% of the solids of the formulation.

The use as an adhesive of a native starch transglycosylation product that has a degree of polymerization higher than DP 7.

The invention provides considerable advantages. The transglycosylation product gives the adhesive good adhesiveness. A holding glued joint is achieved without heating. A functioning adhesive formulation can, for example, be prepared from a water-soluble product of starch transglycosylation, which product is possibly mixed with a starch-based adhesive known per se, in which case it is possible, by means, of the transglycosylation product, to increase the solids content of the formulation without significantly increasing its viscosity. It should be pointed out that starches are indeed used degraded/dextrinated in aqueous adhesives. These formulations contain large amounts of additives, for example, to increase adhesiveness, and the solids level has been raised with various chemicals, such as fillers and sugars. In the present invention, additives are not required for the preparation of a functioning formulation, although they can be used, if so desired.

Transglycolysation products can also be used for preparing hot-melt adhesives, in which case the product is plasticized using a suitable plasticizer. By means of variation of the conditions and reaction time of the transglycosylation reaction and the amounts of reagents it is possible to affect the molecular weight of the product, which enables the properties (viscosity, adhesiveness, melting point, hydrophobicity) of the adhesive to be modified. Additives commonly present in hot melt adhesives can be used, but good adhesion can be achieved even otherwise. In hot-melt adhesives there is used an oligomeric/polymeric transglycosylation product having a degree of polymerization of at least DP 7.

The invention will be examined below more closely with the help of a detailed description and a few examples.

As stated above, the starch-based transglycosylation product of the invention is prepared from a "native starch". This means the same as a "natural starch", i.e. a starch derivable from plants, e.g. tubers or grains. The starch may be based on any native starch having an amylose content of 0-100% and an amylopectin content of 100-0%. Thus the starch may be derived from barley, potato, wheat, oats, peas, corn, tapioca, sago, rice or a similar tuber or grain.

The transglycosylation products are prepared from the above-mentioned starch by reacting it in acid conditions with an alkanol that contains 1-6 hydroxyl groups and by recovering the reaction product. Preferably there is used methanol, butanol, ethylene glycol, propylene glycol, butane diol, trimethylol propane and/or glycerol. These react with the ether bonds between the anhydroglucose units, forming a glycoside wherein an alkyl or hydroxyalkyl group is linked to the terminal anhydroglucose unit of the starch chain through an ether bond. By the use of a multivalent alkanol it is possible to produce a situation in which an anhydroglucose group is linked to each of the two or more hydroxy groups of the alkanol.

In general, in the preparation reaction the starch is mixed with a mono-, di- or triol to form a reaction mixture, the reaction mixture is heated to below the boiling point of alkanol, and the reaction with the mono-, di- or triol is continued until a clear melt is obtained. The reaction mixture is cooled, and the reaction product is precipitated, washed and dried. The reaction product is precipitated in, for example, alcohol. It is also possible to prepare the product in one step so that the reaction product is not separated from the reaction mixture but the solution phase is removed by evaporation.

Typically, there are batched into the reactor 100 parts by weight of starch and 1-200 parts by weight of alkanol (polyol)—according to the number of the hydroxyl groups present in the alkanol/polyol molecule—as well as a catalytic amount of an acid catalyst. The catalysts used are acids, such as sulfuric acid, p-toluene sulfonic acid, and 1-, 2- and 3-valent acids of phosphorus, or acid salts, such as sodium hydrogen sulfate. Since the starch component, in particular in the transglycosylated form, dissolves in alkanol/polyol, it is also possible to use a heterogeneous catalyst, such as an acid ion exchanger resin.

When the starting materials are glycerol and a native starch, e.g. potato starch, there is obtained a mixture made up of glycerol-1-, glycerol-2-, glycerol-1,2-, glycerol-1,3-, and glycerol-1,2,3-O-1-glucopyranoside ethers. This material may contain 1-20% (unreacted) glycerol.

As a result of the transglycosylation reaction, the chain made up of the starch anhydroglucose units is degraded, but according to the invention it is not necessary to carry out the reaction all the way to the monomer stage. On the contrary, it has been observed to be advantageous to leave the molecular weight of the transglycosylation product at the oligomer/polymer stage, in this case at a degree of polymerization of DP 7 or higher (up to DP 300). The product thus obtained has the good properties of transglycosylation products (plasticizing effect, good adhesion), and it provides sufficiently strong bonding. Being relatively small-molecular it is, however, capable of increasing the solids content without affecting the viscosity. The molecular weight of the transglycosylation product is generally 1,200-50,000, preferably 1,300-10,000, and especially preferably 1,300-5,000.

Both solution adhesives and hot-melt adhesives are obtained from the products according to the invention. In general the solids content in the adhesive according to the invention is at least 45% by weight (50-100% by weight); in solution adhesives, solids contents of 50-85% by weight are attained, and in hot-melt adhesives the proportion of solids may be up to 100% by weight.

By "solids content" is meant the amount of material remaining of the adhesive formulation after water has been evaporated from the adhesive formulation. As solids are counted the adhesive or adhesive mixture constituting the actual bonding agent, its possible plasticizer, and any auxiliaries and additives of the solution, such as crosslinking agents, surfactants, waxes, etc.

According to one preferred embodiment of the present invention, technical success of gluing presupposes that the viscosity of the adhesive formulation at a solids content of, for example, 45-65% is, for example, 500-3500 mPas/18-25° C. In this case the adhesive can be applied wet 15-45 $g/m^2$, which corresponds to a dry adhesive dose of 7-30 $g/m^2$. A fiber tear is achieved at 5-60 min from gluing, depending on the product glued and the composition of the adhesive. As the glued joint dries further, the strength of the joint increases.

By "solution adhesive" is meant in this context an adhesive wherein, at room temperature, the starch derivative is dissolved in the medium (i.e. primarily water) of the formulation.

For the preparation of hot-melt adhesives, the transglycosylation products are mixed with a plasticizer. The amount of plasticizer is most suitably 0.01-95% by weight, preferably approx. 1-50% by weight, of the weight of the formulation. Any monomeric or polymeric plasticizers are usable, such as monoacetin, glycerol, triethyl citrate, and oligo esters of succinic acid and polyols, such as diethylene glycol succinate.

From the products according to the invention, a hot-melt adhesive can be prepared in one process, in which case transglycosylation is first carried out according to test 3 of Example 6 of our parallel FI Patent Application No. 20020313, and after the evaporation of the ethylene glycol the desired amount of a plasticizer is added to the product to prepare a hot-melt adhesive.

According to the present invention there is obtained a method for increasing the solids content in starch-based adhesive compositions. According to the invention, a cold-water-soluble starch (e.g. hydrolyzed starch, pre-gelatinized starch or a water-soluble derivative of starch, such as hydroxyalkyl starch) or dextrin is admixed with mixtures of glucose or maltose ethers prepared by transglycosylation from native starch, whereby there are obtained formulations which can be applied more easily than are conventional dextrin adhesives at a high solids concentration. Typically the starch transglycosylation product is added in an amount of 1-50%, preferably 2-30%, of the solids of the formulation to a solution containing a starch-based adhesive.

The invention provides the advantage that the dosing of small amounts of adhesive is easier, the production rate can be increased, and savings can be achieved in the drying costs of the product. The adhesive formulation is stable within a wide temperature range, −10° C. . . . 100° C., and can be stored outdoors, when necessary.

To give an example of the blending of transglycosylation products with known adhesives, reference is made to the fact that by blending a cold-water-soluble starch (DL-20) and a transglycosylation product (250 TGG1) it is possible to prepare an adhesive having a solids content as high as above 60% and a viscosity nearly 50% lower than that of a dextrin adhesive having a corresponding solids content. The said cold-water-soluble starch product DL-20 is in itself an excellent adhesive, but the use of the product is in many applications limited by the high viscosity of its aqueous solution.

Respectively, by the blending of dextrin and 250 TGG1 at a ratio of 1:1, the viscosity of the commercial dextrin adhesive dropped by 96%. This test also showed that the transglycosylation products of starch and polyols can be used for modifying dextrin adhesives that are fully known per se.

The starch-based polyols according to the invention may be present in an adhesive formulation in an amount of 0.1-75% by weight, most suitably 1-60% by weight, preferably 5-50% by weight, depending on the application and the desired viscosity. According to one preferred formulation, the adhesive formulation contains 20-50% of a transglycosylation product, such as 250TGG1 according to Example 7 below and 80-50% of a modified starch, such as hydroxypropyl starch.

The adhesive formulations according to the invention can be admixed with various crosslinking inorganic chemicals, such as boric acid or its salts such as borax, Zr salts, or water-soluble silicates.

In the adhesive formulations according to the invention it is possible to use various poly-functional compounds, for example, dialdehydes such as glyoxal or glutaraldehyde, diepoxides such as ethylene glycol diglycidyl ether, urea, urea derivatives such as hydroxymethyl urea, or multifunctional carboxylic acids such as citric acid.

It is further possible to add to the adhesive formulations various additives or regulators, such as water-soluble ethylene glycol esters, ethylene glycol ethers such as polyethylene glycol, glycerol esters such as monoacetin, CMC or other water-soluble cellulose derivatives such as methyl or ethyl cellulose. To solution adhesives it is also possible to add proteins of vegetable or animal origin.

The concentration of additives and auxiliary agents is in general 0.1-30% by weight of the adhesive formulation.

One example of an especially preferred formulation is an adhesive solution that contains 0.5-1.5 parts by weight of a starch-based adhesive known per se, such as dextrin, 0.5-1.5 parts by weight of a transglycosylation product derived from a native starch, and as additives 1-10% of glyoxal, calculated from the solids content of the adhesive, which is 55% by weight (the balance being water). Typically the adhesive contains 1 part by weight of dextrin and 1 part by weight of the transglycosylation product. An adhesive such as this is usable for 0-8 h from the adding of the glyoxal.

With a 5% glyoxal dose the viscosity of the adhesive increased in the course of 3 h from 1003 mPas to 1400 mPas, measured at a shear rate of 750 rpm at 25° C. By means of a glyoxal addition it is, for example, possible to improve the water resistance of the glued joint and to increase the strength of the glued structure.

Solution adhesives according to the invention can be used for the gluing of fiber-based products, such as papers and board. The adhesive can be applied in any manner by any known application technique, such as blade application, roller application, rod application or spray application. The viscosity of the adhesive can be adjusted to suit the application method.

The application temperature of hot-melt adhesives is typically 90-250° C.

The following, non-limiting examples illustrate the invention:

EXAMPLE 1

Starch Transglycosylation in an Excess of Glycerol

Glycerol (452 g) and 1 g of sulfuric acid are mixed together and the mixture is heated to 120° C. in a nitrogen atmosphere. 200 g of starch is fed into the mixture within 45 min under efficient stirring. The temperature is maintained at 120° C. during the adding of the starch and also for half an hour after the last addition. The water vapor is removed by vacuum suction. The temperature is increased to 130° C. and maintained at that for 0.5 h, and the reaction mixture is cooled. The reaction mixture is neutralized with 1 g of calcium carbonate and is diluted to a 50% water solution. Active carbon is added in small batches to remove the color until the solution is colorless. The active carbon and the calcium sulfate formed in the neutralization are filtered off. When necessary, water may be removed from the filtrate by evaporation and the glycerol glucose ethers can be separated from the glycerol by dissolving the water-free crude product in 96.4% ethanol, whereafter acetone is fed into the solution. Glucose ethers precipitate when the acetone to water ratio is 1:1 vol.:vol.

On the basis of an HPLC analysis, a large amount of glycerol favors monomeric products, the proportion of which was approx. 69% and that of oligomeric products 31%.

EXAMPLE 2

Starch Transglycosylation as a Dry Reaction 6 kg of potato starch (5 kg calculated as solids), 0.568 kg of glycerol and 5 g of sulfuric acid that had first been mixed with the glycerol were placed in a reactor (Lödige vacuum contact drier), and the mixture was homogenized for 1 h at 20° C. by using the lump crusher of the reactor. Thereafter the reaction mixture was stirred slowly and the vacuum pump of the reactor was switched on. The reaction mixture was heated to 120° C. (steam in reactor mantle), the temperature being 66-74° C. during the drying. The drying was continued for 1.5 h. The vacuum was switched off and the stirring was raised to its maximum. The reaction mixture was stirred for 3 h at 105-108° C. The reaction mixture was slurried in three times of its weight of water and was stirred for 1 h, was filtered, and was washed with 96% ethanol and was dried at room temperature.

The product was a white, finely divided powder the viscosity of which had decreased to one-hundredth as compared with the initial starch. The measuring was carried out with a Bohl rheometer at an operating speed of 146 l/s by using a 7.5% starch solution that had been made in 3% sodium hydroxide.

EXAMPLE 3

Starch Transglycosylation in Various Reaction Conditions and its Effect on Product Distribution The reaction was carried out in a manner corresponding to that in Example 1, by using the materials amounts and conditions indicated in Table 1.

TABLE 1

| Test code | Starch | Alcohol | Starch/alcohol mass ratio | Conditions |
|---|---|---|---|---|
| 10TG1-00 | Potato starch | Glycerol | 0.5/1.0 | 108° C./90 min |
| TG14-01 | Potato starch | Glycerol | 1.5/1.0 | 120° C./11 h |

The products were purified as follows: 100 g of the crude product and 1000 ml of isopropanol were mixed using an efficient stirrer until the product solidified and a clear precipitate formed. The precipitate was allowed to settle and the isopropanol was decanted off. The precipitate was washed with 1000 ml of isopropanol, was filtered and dried. Final drying in a heating chamber at 70° C.

The product distribution was characterized liquid chromatographically. No glycerol was found in the purified products, i.e. the purification was successful. The following table (Table 2) shows the percentages of the products shown in the chromatogram at different retention times.

TABLE 2

|  | m/m | RT1 | % | RT2 | % | RT3 | % | RT4 | % | RT5 | % | RT6 | % |
|---|---|---|---|---|---|---|---|---|---|---|---|---|---|
| 10TG100 | 0.5/1 | 4.889 | 9.5 | 5.697 | 4.6 | 6.238 | 12.2 | 7.27 | 35.9 | 8.413 | 9.4 | 9.123 | 28.3 |
| TG14 | 1.5/1 | 5.15 | 59.5 | — |  | — |  | 7.152 | 13.0 | 8.415 | 13.1 | 9.133 | 14.4 | m/m = ratio of starting material to diol

An NMR analysis was run on product 10TG1-00 and the analysis showed that the product consisted of an ether of glycerol and glucose. In the product the glycerol has formed 1-monoether, 2-monoether, 1,2-diether and 1,2,3-triether at the C-1 position in the glucose. The signals of 1,4-alpha bonds, characteristic of starches, were lacking in the 10TG100 spectrum of the product, which shows that only 1 glucose unit at a time has been linked to the hydroxyl of glycerol. The reaction product does not contain significant amounts of glucose or maltose. On the basis of test TG14, the product distribution can be affected by raising the ratio of starch to polyol in the initial situation.

The products were white powders in state. The coloring of the product can be prevented by the use of a small amount of an acid catalyst and a temperature below 120° C.

EXAMPLE 4

Pilot-Scale Transglycosylation Reaction of Starch with Glycerol

Glycerol (61 kg) and sulfuric acid (70 g) are introduced into the reactor and are stirred. Potato starch (39 kg) is added to the mixture under efficient stirring. The temperature is raised to 117° C., and the water vapor is removed by vacuum suction. When the starch has dissolved in the glycerol, 62 kg of potato starch is added gradually to the reaction mixture. The stirring and heating are continued for a total of 4 h. When cold, the product (250TGG-1) is a completely water-soluble, highly viscous syrup that becomes very fluid when heated.

EXAMPLE 5

Use of a Starch Transglycosylation Product in a High-Solids Adhesive, the Gluing Taking Place by Heating Adhesive formulations according to the following table (Table 3) were prepared.

TABLE 3

| Adhesive formulations/Composition | I % | II % | III % |
|---|---|---|---|
| Starch polyol (Product according to Ecample 2) | 36.9 | 41.9 | 43.1* |
| Oligomeric starch polyol (Product according to Example 3) | 11.8 |  |  |
| Glycerol-containing transglycosylation product (starch:glycerol 1:1) |  | 34.9 |  |
| Water |  | 51 | 23.3 | 57.9 |
| Solids |  | 49% | 76.7% | 40.1 |

*Approx. 7% of the polyol had been dissolved by boiling.

The adhesives were applied to paper. After the application, another paper was placed on the adhesive surface and was pressed for 1-5 min with a hot roll weighing approx. 1 kg. The glued paper was dried at 100° C. overnight. The following day the efficacy of the gluing was studied by pulling the paper glued on top from the bottom paper. In all cases a highly successful gluing was achieved, i.e. the result was a 100% fiber tear in the paper. The tests show that from the transglycosylation products it is possible to prepare high-solids adhesive formulations with which a good gluing result is obtained. Untreated starch can also be mixed with the adhesives.

EXAMPLE 6

Use of Starch Transglycosylation Products in Starch-Based Solution Adhesives

Test 1

A hydroxypropyl derivative (COHPOL DL 20) of an enzymatically hydrolyzed starch, having a solids content of 52%, and the product according to Example 4 as a 50% aqueous solution were mixed at such a ratio that the weight ratio of the solids was 1:1. The solids content of the prepared adhesive was 52% and its Brookfield viscosity at 20° C. was 5600 mPas.

Test 2

A hydroxypropyl derivative (COHPOL DL 20) of an enzymatically hydrolyzed starch, having a solids content of 52%, and the product according to Example 4 were mixed at such a ratio that the ratio of the solids in a 57% adhesive solution was 2.6:0.6. The Brookfield viscosity of the adhesive at 20° C. was 34,000 mPas.

A gluing test was carried out with the adhesives according to the tests by applying the adhesives with a rod, a roller or a slit nozzle to the surface of paper. After the application of the glue, another paper was placed immediately on the adhesive and was rolled with an approx. 1 kg roll back and forth. The glue joints were dried at 20° C. for 5-60 min. In each case, a 100% fiber tear in the paper was achieved, even with short drying times, when the papers were pulled apart. The tests show that from starch transglycosylation products it is possible to prepare solution adhesives which have a solids content over 50% and a low viscosity, and by means of which a good gluing result is obtained.

EXAMPLE 7

The present example examines the viscosities of aqueous solutions of glycerol-O-1-glucopyranoside ethers (250 TGG-1, Example 4) as a function of the solids content (Table 4), and the viscosities of adhesives prepared from them are compared as a function of the solids content at a shear rate of 750 rpm and a temperature of 25° C. (Table 5).

TABLE 4

| 250TGG-1 mPas | Solids content % | DL20 mPas |
|---|---|---|
| 10 | 40 | 1000 |
| 10 | 50 | 3140 |
| 10 | 60 | — |
| 10 | 70 | — |
| 1000 | 80 | — |

250TGG-1: glycerol glucose ethers (Example 4)
DL20: hydroxypropyl derivative of enzymatically hydrolyzed starch MS 1.2.

TABLE 5

| Adhesive | Component A | Component B | Mass ratio A:B | Solids content | rpm | MPas 25° C. |
|---|---|---|---|---|---|---|
| 1 | Dextrin | 0 | 1:0 | 57 | 750 | 3540 |
| 2 | DL-20 | 0 | 1:0 | 40 | 750 | 1000 |
| 3 | Dextrin | 250TGG | 1:1 | 57 | 750 | 150 |
| 4 | DL-20 | 250TGG | 1:1 | 57 | 750 | 1280 |
| 5 | DL-20 | 250TGG | 1:1 | 62 | 750 | 2020 |

The example shows that the solids content of an adhesive can be increased by means of transglycosylation products to >60% while maintaining the viscosity at a low level.

EXAMPLE 8

Gluing Tests with Adhesives Based on Transglycosylation Products

Materials
DL20: Enzymatically degraded hydroxypropylated starch MS: 1,2 250TGG-1: A mixture according to Example 4, made up of glycerol-1-, glycerol-2-, glycerol-1,2-, glycerol-1,3- and glycerol-1,2,3-O-1-glucopyranoside ethers (prepared from potato starch); in addition this material may contain glycerol 1-20%.

In the example, the dosing of adhesive onto the paper sheets to be glued was studied. The adhesives were dosed by roller application, each with the same application roller at 18-22° C. The gluing result was assessed at 24 h after the gluing. The results are shown in Table 6.

A fiber tear of 100% was achieved with the adhesives. In addition it was observed that the adhesives containing the transglycosylation product or the starch derivative DL-20 withstood the folding of the paper sheet without the glued joint breaking.

The invention claimed is:
1. An adhesive formulation, which comprises a starch-based adhesive dissolved in water, characterized in that the adhesive comprises a transglycosylation product of native starch, that has a degree of polymerization higher than DP 7, formed from a multivalent alkanol.
2. The adhesive formulation according to claim 1, characterized in that its solids content is at least 45% by weight.
3. The adhesive formulation according to claim 1 or 2, characterized in that it contains an alkyl or hydroxyalkyl glycoside, wherein the alkyl or hydroxyalkyl groups in the glycoside residue comprise a 1-4 carbon atom chain, which has 0-3 free hydroxyl groups and is linked to the C-1 of the anhydroglucose unit through an oxide group.
4. The adhesive formulation according to claim 3, characterized in that the alkyl or hydroxyalkyl groups of the glycoside have been derived from ethylene glycol, propylene glycol, butane diol or glycerol.
5. The adhesive formulation according to claim 1, characterized in that it contains 0.1-70% by weight of the transglycosylation product.
6. The adhesive formulation according to claim 5, characterized in that it contains at least one other starch-based adhesive component.
7. The adhesive formulation according to claim 6, characterized in that it contains a cold-water-soluble starch and/or dextrin and/or a water-soluble transglycosylation product of a starch derivative.
8. The adhesive formulation according to claim 1, characterized in that the molecular weight of the native starch transglycosylation product is 1,200-50,000.
9. The adhesive formulation according to claim 1, characterized in that it contains as additives, calculated from the formulation, 0.01-30% by weight of,
inorganic chemicals,
one or more of, dialdehydes, diepoxides, urea, or multifunctional carboxylic acids,
and one or more of water-soluble ethylene glycol esters, ethylene glycol ethers, glycerol esters, CMC, or other water-soluble cellulose derivatives and/or proteins.
10. The adhesive formulation of claim 1, formed by a process comprising the steps of:
forming a mixture of a starch and a multivalent alcohol;
mixing and heating until a clear melt is obtained;
adding a catalytic amount of an acid catalyst; and
dissolving the product in water.
11. An adhesive formulation, which comprises a starch-based adhesive dissolved in water, characterized in that the adhesive comprises a transglycosylation product of native starch, that has a degree of polymerization higher than DP 7,

TABLE 6

| Application roller No. 1 | A | B | A:B | Solids content % | η mPas 750 rpm | Dose g/m² wet | Dose g/m² dry | Amount of water g/m² | Adhesion at 24 h | 180° scoring |
|---|---|---|---|---|---|---|---|---|---|---|
| 1 | Dextrin | 0 | 1:0 | 57 | 3540 | 49 | 28 | 21 | 100% | Break |
| 2 | DL-20 | 0 | 1:0 | 40 | 1000 | 32 | 13 | 19 | 100% | Withstands |
| 3 | DL-20 | 250 TGG-1 | 1:1 | 62 | 2020 | 33 | 21 | 14 | 100% | Withstands |
| 4 | DL-20 | 250 TGG-1 | 1:1 | 57 | 1280 | 31 | 18 | 13 | 100% | Withstands | and further characterized in that the transglycosylation product comprises a reaction product of a native starch and glycerol, in which case the adhesive of the formulation is made up of a mixture containing glycerol-1-, glycerol-2-, glycerol-1,2-, glycerol-1,3- and/or glycerol-1,2,3-O-1-glucopyranoside ethers.

12. A method of preparing starch-based adhesive formulations, according to which method a starch-based polymer is dissolved in water, characterized in that the starch-based polymer used is a native starch transglycosylation product, that has a degree of polymerization higher than DP 7, which is mixed with and dissolved in water, optionally together with another starch-based adhesive, in order to produce an aqueous solution having a solids content of at least 45%.

13. A method of increasing the solids contents of starch-based adhesive formulations, characterized in that to a mixture or solution containing a starch-based adhesive there is added a starch transglycosylation product, that has a degree of polymerization higher than DP 7, so that its concentration will be 0.1-75% of the solids of the formulation.

14. The method according to claim 13, characterized in that the starch transglycosylation product is added to a solution containing a starch-based adhesive in an amount of 1-50% of the solids of the formulation.

* * * * *